Dec. 16, 1952     C. Q. GLASSEY     2,621,569
FLASHING LAMP FOR HALFTONE CAMERAS
Filed June 10, 1949
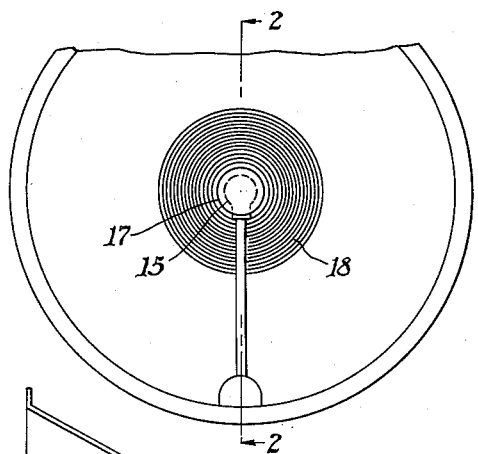
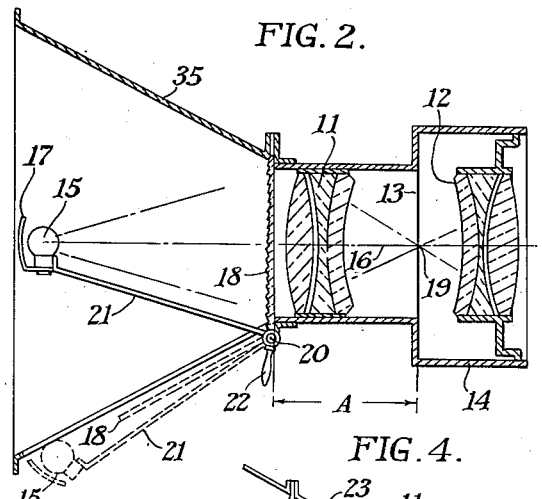
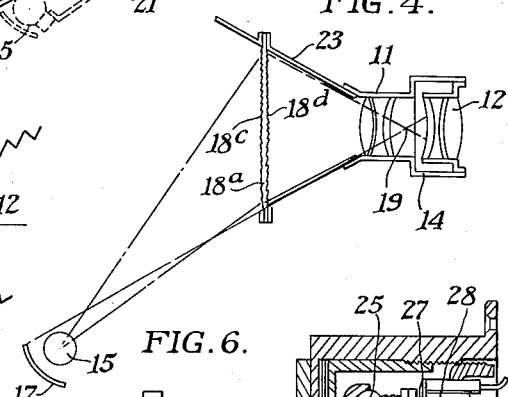
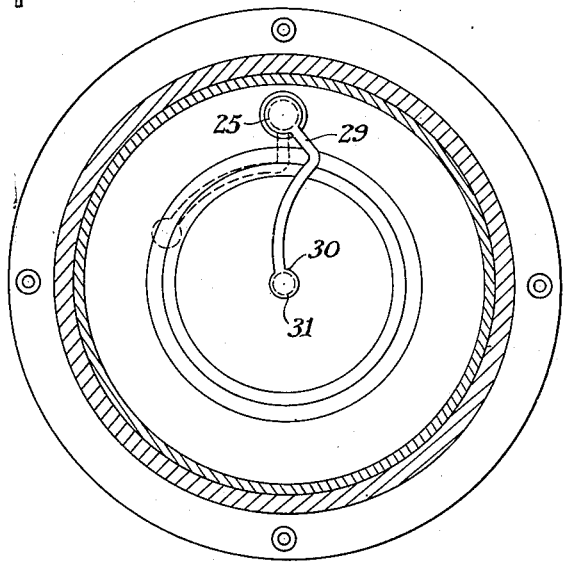
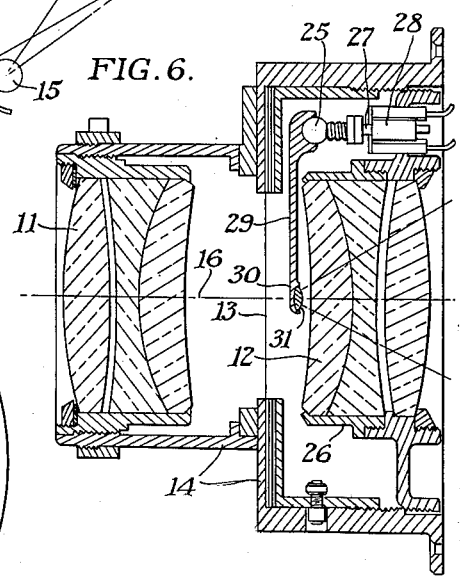
COURTNEY Q. GLASSEY
INVENTOR Patented Dec. 16, 1952

2,621,569

UNITED STATES PATENT OFFICE 2,621,569

FLASHING LAMP FOR HALFTONE CAMERAS

Courtney Q. Glassey, Rochester, N. Y., assignor to Eastman Kodak Company, Rochester, N. Y., a corporation of New Jersey Application June 10, 1949, Serial No. 98,286

2 Claims. (Cl. 95—1)

1

The present invention relates to photography, and more particularly to photomechanical halftone processes.

As is well known, in making a halftone reproduction, the film is exposed through a halftone screen placed adjacent and parallel to the film. The openings in the screen act as pinhole lenses which form images of the opening of the camera lens upon the negative to form small dots arranged in a definite relation on the negative to form the picture exposed through the camera lens.

After the regular exposure is completed, a "flashing" exposure is made to put hard, high density cores in the centers of all the halftone dots. This "flashing" exposure is commonly made by either of two methods. The copy on the easel is covered by a uniform white surface, which illuminates the lens aperture (usually f:64 or f:90) to give the "flashing" exposure to the film. In the second common method, a large lamp (upward of 200 watts) with condenser and/or diffuser is placed (manually or mechanically) immediately in front of the lens to illuminate the lens aperture as above.

The ability to make a supplementary exposure for "flashing" requires that a uniform cone of light appears to diverge from the exit pupil of the process lens toward the film, and that the angle of this cone of light should be sufficient to cover the largest size of film that can be accommodated at the shortest camera extension. This practice is common to the art.

To secure this result, the present invention provides a more efficient arrangement for placing a light source, or an image thereof, relatively small size and good uniformity or symmetry substantially at the plane of the diaphragm of the process lens. In order to eliminate lens flare resulting from stray light from the copy illuminating means, the process lens is provided with a forwardly extending lens hood. The latter serves to support the flashing lamp and a field lens which are mounted so as to be swung to and from the axis of the process lens. The dimensions and power of the lamp and lens are such that an image of finite size and symmetry is placed substantially in the plane of the diaphragm of the camera lens and on the axis of the latter.

In order to accommodate process lenses of different designs and focal lengths with a basic lens hood construction, the present invention provides individual spacers or an adjustable spacer which may be used to bring the image of the lamp into focus at the lens diaphragm and on the lens axis.

The present invention has as its principal object the provision of an arrangement for positioning a small "flashing" light source of a small image of such a light source substantially at the plane of the process lens diaphragm and on the axis of the process lens.

A further object of the invention is the provision of a field lens and a "flashing" lamp positioned in front of the camera lens and so arranged relative thereto that a small image of the lamp will be formed on the lens axis and substantially in the plane of the lens diaphragm.

Yet another object of the invention is the provision of an arrangement by which a "flashing" lamp and a field lens are mounted on the lens hood so that the lamp and lens or the lens only may be moved to and from the field with the camera lens.

Still another object of the invention is the provision of a spacer connecting the lens hood and the camera lens, the spacer being of such length that the field lens will bring the image of the "flashing" lamp into focus at the iris or camera lens diaphragm.

Still another object of the invention is to improve the efficiency of the use of the light from the small lamp by using a relatively small filament or source and by improving the optical corrections of the said lens. In the preferred arrangement the lens will be a Fresnel type corrected for spherical aberration.

To these and other ends, the invention resides in certain improvements and combinations of parts, all as will be hereinafter more fully described, the novel features being pointed out in the claims at the end of the specification.

In the drawings:

Fig. 1 is a front view of the camera lens and lens hood, showing the relation thereto of the "flashing" lamp and the field lens arrangement of the present invention;

Fig. 2 is a vertical sectional view through the lens and lens hood, showing the relation of the parts, and the relative positions of the "flashing" lamp and the field lens;

Fig. 3 is a view similar to Fig. 2, but with a process lens of a shorter focal length, showing the use of the spacer for securing the desired focus of the "flashing" lamp at the lens diaphragm;

Fig. 4 is a view similar to Fig. 3, but showing the "flashing" lamp fixed in a position removed from the field of the camera lens:

Fig. 5 is a front view of a modified "flashing" lamp arrangement in which the light source is placed directly within the process lens and its light is directed with a plastic rod to cause divergence from the plane of the lens diaphragm; and Fig. 6 is a vertical sectional view through the mechanism illustrated in Fig. 5, showing the relation of the "flashing" lamp to the camera lens components, and the means for moving the plastic rod to and from the operative position.

Similar reference numerals throughout the various views indicate the same parts.

As halftone cameras, and the screens used in connection therewith, are well known, they are not illustrated or described.

In the present invention, the camera, of any suitable or well-known construction, is provided with an optically corrected lens which comprises spaced front and back components 11 and 12 respectively, and a diaphragm 13 positioned therebetween. This diaphragm may be of the iris or of the "Waterhouse" type. The lens components and the diaphragm are positioned in a suitable lens mount 14 which holds the parts in optical alignment, as is apparent from the drawings. A lens hood 35, of any suitable construction, is secured to and extends forwardly of the process lens to protect the latter against stray light, the disadvantages of which are apparent to those in the art.

In order to make the "flashing" exposure, a small lamp 15, of less than 200 watts, is arranged in front of the camera lens to illuminate the latter after the usual exposure. As shown in Figs. 1 to 3, the lamp may be positioned on the axis 16 of the camera lens, and may be backed by a suitable reflector 17. A field lens 18, preferably in the form of a plastic "Fresnel" condenser lens, is positioned within the lens hood between the "flashing" lamp 15 and the camera lens. The lens 18 has a relative aperture of less than f:1.0. The power of the "Fresnel" lens 18 and the front component 11 of the camera lens is such as to bring the image of the lamp 15 to a focus substantially at the lens diaphragm, as illustrated at 19. The result is that a divergent beam of light will radiate from a point (of finite size) on the axis 16 substantially at the plane of the diaphragm 13, and this beam will give exposures that will be developed into hard, high density cores in the centers of all the halftone dots, as is deemed apparent to those in the art.

During the "flashing" exposure, it is necessary to position the lamp 15 and the lens 18 so as to form an image of the lamp filament at the point 19. However, during a normal exposure, the lamp 15 and lens 18 are not needed and should be removed from the field of the camera lens, as is apparent. To secure this result, the present invention provides a means to mount pivotably or swingably the lamp 15 and lens 18 so that they may be moved selectively either to their operative position, as shown in full lines in Fig. 2, during the "flashing" exposure, or to their inoperative position, as shown in dotted lines in Fig. 2, during the regular exposure. To this end, the lens hood is provided with a shaft 20 on which the lens 18 is mounted directly. This shaft also carries a forwardly extending arm 21 on the free end of which the lamp 15 and reflector 17 are mounted, as best shown in Fig. 2. Any suitable means, such as handles 22, may be provided for moving the lamp 15 and lens 18 to and from flashing position. These members may be moved separately by separate handles, or they may be geared together so as to be moved by a single handle. As a wide variety of moving means will readily suggest themselves to any mechanic, further details are not deemed necessary to a full understanding of the present invention. Suffice it to say that any means which will move the lens 18 and lamp 15 into and out of position is all that is required.

In the arrangement shown in Figs. 2 and 3, both the lamp 15 and the lens 18 are movable or swingably mounted for movement to and from the field of the camera lens. In this embodiment, the axis of the lamp 15 and the lens 18, when in operative position, coincide with the lens axis 16, as illustrated.

Fig. 4 shows a modified arrangement in which the lamp 15 and its reflector 17 are fixedly positioned outside the field of the camera lens and outside the lens hood. With such an arrangement, only the lens 18a need be swung into and out of the position. It will be noted that in this modified arrangement, the axis of the lamp 15 no longer coincides with the camera lens axis, but the Fresnel lens may be designed to position the image of the lamp at the plane of the lens diaphragm 19. An example of such a design is given below. Obviously, in order that this arrangement will be operative, the bottom of the lens hood may be cut away or recessed to enable the light rays from the lamp to reach the field lens 18.

In the arrangement illustrated in Fig. 4, the field or "Fresnel" lens is provided with two figured surfaces, as shown. The axes of the two surfaces do not coincide. In the preferred arrangement, the front or left surface 18c is prismatic so that the virtual source of light striking the second or rear surface 18d is on the axis of the second surface. In this arrangement, all the power is in the rear surface 18d. With this preferred form, the light will be substantially divergent between the two surfaces.

Thus, in the embodiment shown in Figs. 1–4, a field lens and a "flashing" lamp are positioned ahead of the camera lens, and the image of the lamp is brought to a focus at the axis of the camera lens and substantially at the plane of the diaphragm. In the arrangement shown in Figs. 2 and 3, both the lamp and field lens must be mounted for swinging movement, while in the embodiment illustrated in Fig. 4, only the field lens need be moved. However, in both embodiments, the light source is actually positioned in front of the camera lens, and the image at the diaphragm serves to provide the divergent beam necessary to expose the cores in all the halftone dots.

In order to insure the desired result during the flashing operation, it is essential that the distance "A" between the field or "Fresnel" lens 18 and the plane of the diaphragm 13 be maintained constant for different focal length lenses. Figs. 3 and 4 show a camera lens of a shorter focal length than that shown in Fig. 2. It will be apparent from the drawings that the front lens component 11 of Figs. 3 and 4 are further away from the field lens 18 than in Fig. 2. In order to compensate for this difference, the present invention provides a spacer 23 which is interposed between the front of the camera lens and the rear of the lens hood to maintain the distance "A" constant so that the image of the lamp 15 will always be focused in the plane of the diaphragm irrespective of the focal length of the camera lens, as is apparent from an inspection of the drawings. For different focal length lenses, different length spacers are required. However, to simplify the structure, the spacer may be made in the form of a pair of telescopic or sliding sleeve members which may be adjusted axially to provide a spacer of the desired length.

Fig. 6 shows another modification, in which the lamp 15 and field lens 18 may be eliminated entirely. In their place a small source of light is arranged for movement to and from the lens axis 16 and substantially in the plane of the diaphragm 13. This result can be secured in a number of ways. For example, a small lamp 25, of low wattage, may be positioned in the lens mount 14 just back of the diaphragm 13 and outside the cell 26 which carries a rear lens component 12. This lamp is mounted on the shaft 27 of a small electrical meter movement 28 of well-known construction. The lamp carries a radially-extending light tube or rod 29 of white transparent material, the free end 30 of which terminates at the lens axis 16 and is bent rearwardly or to the right, as viewed in Fig. 6, to provide a small diffuse light source which is positioned on the lens axis and substantially in the plane of the lens diaphragm and is directed toward the film. This small beam provides the desired "flashing" light. It is preferred to form a small diffuse field lens 31 at the free end 30 of the light tube or rod 29. By energizing the movement 28, the rod 29 may be swung about the shaft 27 to position the free end 30 on the lens axis 16 and substantially in the plane of the diaphragm, as shown in Fig. 6 and in full lines in Fig. 5, or the rod may be swung to its inoperative position as shown in dotted lines in Fig. 5, so as to be out of the light path to the camera lens, as is apparent.

The same result can be secured, however, by mounting an arm on the shaft 28 and having a miniature medical lamp, such as the "grain of wheat" lamp, not shown, carried by the free end of this arm, so that the movement of the shaft 28 will move the lamp into and out of position. This arrangement would differ slightly from that shown in Fig. 6, in that an actual light source, as distinguished from the image thereof, would be positioned on the lens axis. However, either the "grain of wheat" lamp or the lamp image of Figs. 1 to 6 is positioned on the lens axis and in the plane of the diaphragm to provide the divergent beam which gives the desired flash exposure.

The present invention thus provides a "flashing" lamp arrangement which provides a light beam which radiates from the lens axis and at a point substantially in the plane of the camera lens diaphragm to provide the hard central exposures for all the halftone dots. In certain embodiments, the "flashing" lamp and/or a field lens is movable into and out of the field of the camera lens. Spacers are provided between the lens hood and the camera lens to insure a constant spacing between the field lens and the diaphragm for lenses of different focal length.

While certain embodiments of the invention have been disclosed, it is to be understood that the inventive idea may be carried out in a number of ways. This application is, therefore, not to be limited to the precise details described but is intended to cover all variations and modifications thereof which fall within the scope of the appended claims.

I claim:

1. A flashing attachment for use on a halftone camera having an optically corrected lens and comprising, in combination, a lens hood mounted on and extending forwardly of said lens, a field lens carried by said hood and physically positionable on the axis of the camera lens and adjacent the latter, a light source mounted on said hood and positioned to illuminate said field lens so that the latter will form an image of said source on the axis of and within said lens, means to move said field lens to and from the field of said camera lens, and an adaptor for connecting said hood to said camera lens to position said field lens and said light source in a definite spaced relation to said camera lens.

2. A flashing attachment for use on a halftone camera having an optically corrected lens and comprising, in combination, a lens hood mounted on and extending forwardly of said lens, a field lens carried by said hood and physically positionable on the axis of the camera lens and adjacent the latter, a light source mounted on said hood and positionable on said axis to illuminate said field lens so that the latter will form an image of said source on the axis of and within said camera lens, means to move both the field lens and the light source to and from the field of the camera lens, and an adaptor for connecting said hood to said camera lens to position said field lens and said light source in a definite space relation to said camera lens.

COURTNEY Q. GLASSEY.

REFERENCES CITED

The following references are of record in the file of this patent:

UNITED STATES PATENTS

| Number | Name | Date |
|---|---|---|
| 999,115 | LeBean | July 25, 1911 |
| 1,157,020 | McCarthy | Oct. 19, 1915 |
| 1,598,746 | Roes | Sept. 7, 1926 |
| 2,135,575 | Hansch | Nov. 8, 1938 |
| 2,332,587 | Mendelsohn | Oct. 26, 1943 |
| 2,339,377 | Clark | Jan. 18, 1944 |